A. B. CRAIG.
COOLING DEVICE FOR PNEUMATIC TIRES.
APPLICATION FILED JAN. 31, 1912.
1,038,092.
Patented Sept. 10, 1912.
2 SHEETS—SHEET 1.
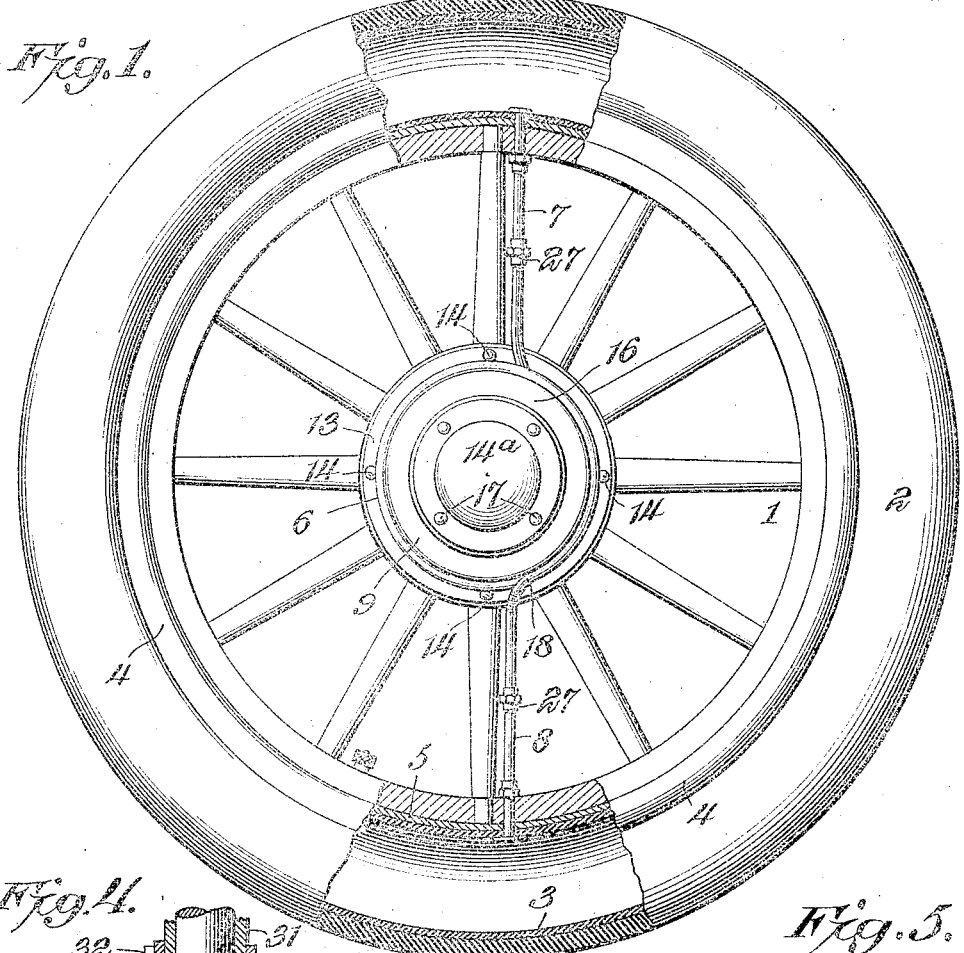
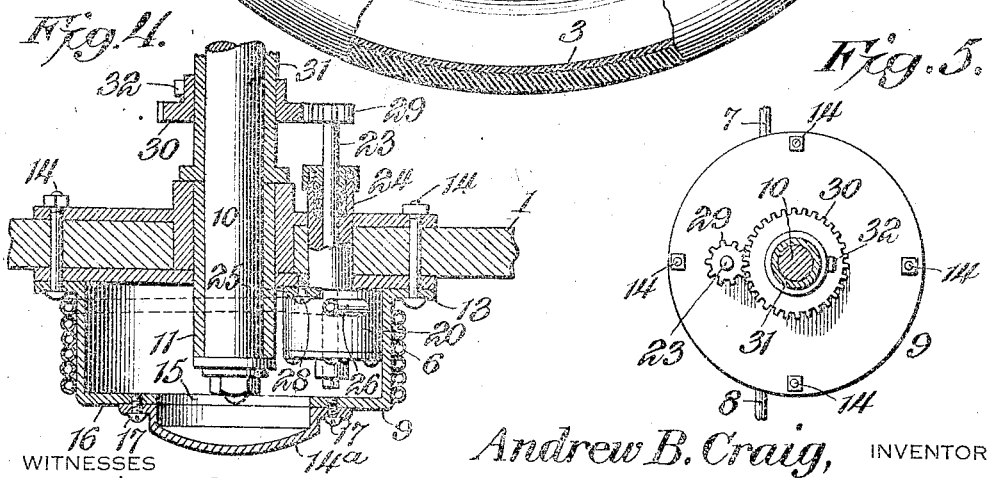
Andrew B. Craig, INVENTOR,
BY
ATTORNEY

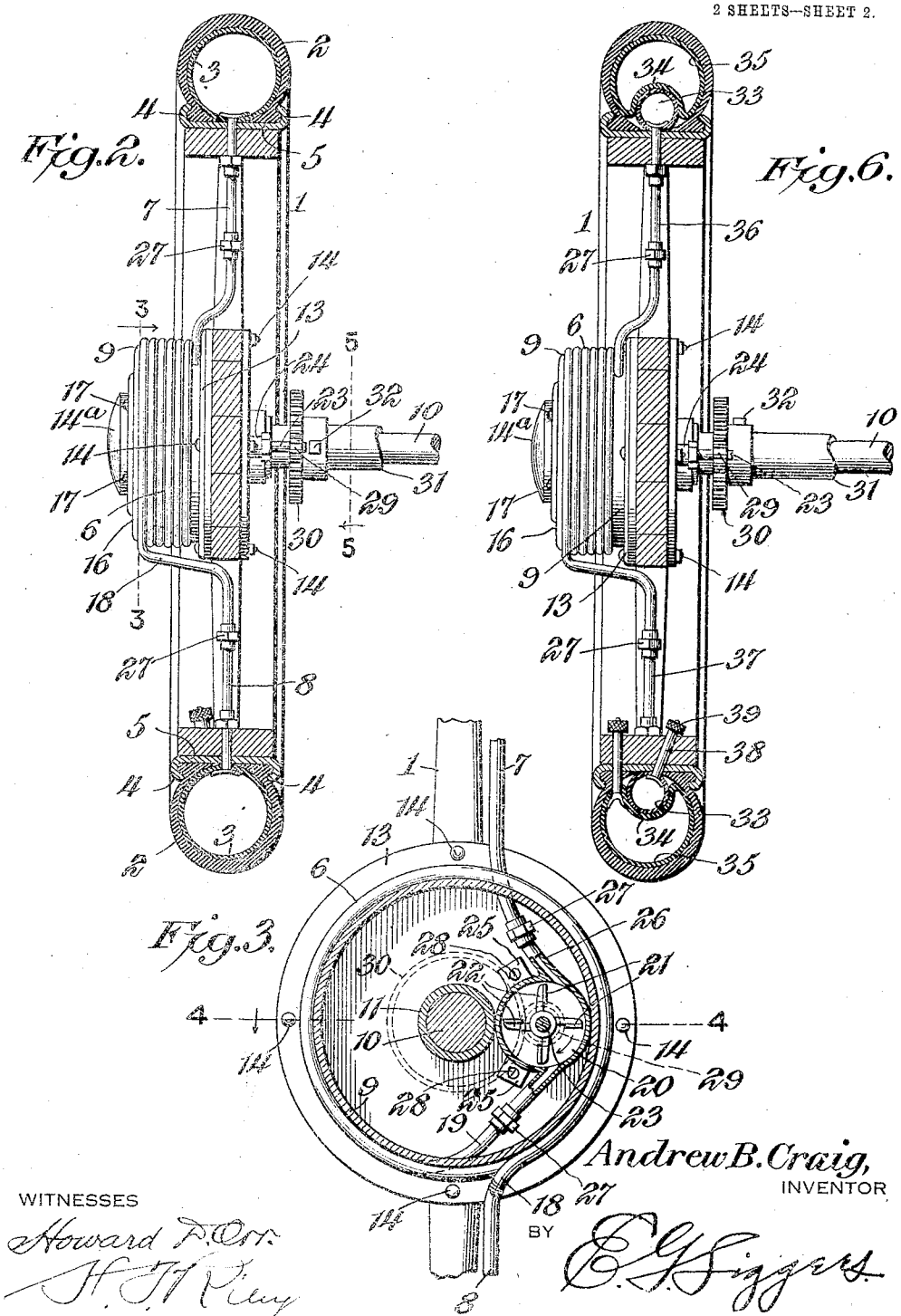

UNITED STATES PATENT OFFICE.

ANDREW B. CRAIG, OF TARKIO, MISSOURI.

COOLING DEVICE FOR PNEUMATIC TIRES.

1,038,092.

Specification of Letters Patent. Patented Sept. 10, 1912.

Application filed January 31, 1912. Serial No. 674,489.

*To all whom it may concern:*

Be it known that I, ANDREW B. CRAIG, a citizen of the United States, residing at Tarkio, in the county of Atchison and State of Missouri, have invented a new and useful Cooling Device for Pneumatic Tires, of which the following is a specification.

The invention relates to improvements in cooling devices for pneumatic tires.

The object of the present invention is to improve the construction of cooling devices for pneumatic tires, more especially that shown and described in an application, filed by me on or about Sept. 7, 1911, Serial No. 648233, and to provide a simple, efficient and compactly arranged device of inexpensive construction, equipped with a rotary pump, adapted to be housed within the hub portion of a wheel and capable of causing the circulation of air or other cooling medium through a pneumatic tire to maintain a relatively low temperature within the same to prevent the tire from heating and bursting.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation, partly in section, of a wheel having a pneumatic tire and equipped with a cooling device, constructed in accordance with this invention and adapted for circulating air through the pneumatic tire. Fig. 2 is a transverse sectional view of the wheel, the cooling device being shown in elevation. Fig. 3 is an enlarged sectional view on the line 3—3 of Fig. 2. Fig. 4 is an enlarged sectional view on the line 4—4 of Fig. 3. Fig. 5 is a similar view on the line 5—5 of Fig. 2. Fig. 6 is a transverse sectional view of a wheel, the cooling device being arranged for circulating a cooling liquid circumferentially within the tire.

Like numerals of reference designate corresponding parts in all the figures of the drawings.

In the accompanying drawings in which is illustrated the preferred embodiment of the invention, 1 designates a wheel having a pneumatic tire 2, consisting of an outer tube or shoe and an inner tube 3. The outer tube or shoe of the pneumatic tire is of the clencher type and engages the side flanges 4 of the rim 5 of the wheel, but the pneumatic tire can be of any preferred type and may be mounted in any desired manner.

The pneumatic tire is connected at diametrically opposite points with a radiator 6 by branch pipes or tubes 7 and 8, having their outer portions piercing the rim, felly and the inner tube and suitably secured to the wheel. The radiator 6 preferably consists of a cylindrical coil, mounted upon and supported by a cylindrical casing 9, arranged at the center of the wheel at the outer side thereof, and forming a false hub section or member and surrounding and receiving the outer end of the axle 10 and the axle box or bushing 11. The cylindrical casing is provided at its inner portion with an annular attaching flange 12, secured by bolts 14, or other suitable fastening devices to the wheel. The cylindrical casing is also equipped at the front with a removable plate 14ª, covering an opening 15 and detachably secured to the front wall 16 by screws 17, or other suitable fastening devices, and adapted when removed to afford access to the interior of the casing. The outer end 18 of the coil is extended to form the branch or connecting pipe 8, and the inner end 19 is extended inwardly and is connected with a cylindrical casing 20 of a rotary pump.

The rotary pump comprises the said casing 20 and a plurality of blades 21, mounted on radial arms 22 of a shaft 23, which is journaled in suitable bearings of the hub of the wheel, a stuffing box 24 being preferably provided at the inner side of the latter from which the shaft 23 projects, as clearly illustrated in Fig. 4 of the drawings. The cylindrical pump casing is provided with attaching lugs or flanges 25, and the inner terminal portion 19 of the radiator coil is connected with the periphery of the fan casing at one side thereof, while the inner end 26 of the branch or connecting tube 7 is connected with the peripheral portion of the casing at substantially a diametrically opposite point. By this arrangement, the rotary pump is adapted to draw the air from the pneumatic tire at one point on the wheel and to cause the air to circulate through the radiator coil, and after cooling the air to drive the same back to the tire at a point diametrically opposite the place where the air is drawn from the tire. In this manner, the air within the pneumatic tire is maintained at a sufficiently low temperature to prevent the tire from heating and bursting. The branch or connecting pipes are preferably made in sections, and the several portions of the pipe are connected together by suitable couplings 27. The rotary pump is arranged eccentrically of the wheel between the axle box and the peripheral portion of the cylindrical casing 9, and the attaching lugs of the pump casing are secured to the wheel by screws 28, or other suitable fastening devices.

The eccentrically arranged shaft of the rotary pump carries a pinion 29, meshing with a fixed gear 30, which is mounted upon a fixed sleeve 31, surrounding the axle, but the fixed gear may, of course, be mounted in any suitable manner to adapt it for use on either the front or rear axle of an automobile, motor, or other vehicle. The fixed gear is adapted through the rotary movement of the wheel to rotate the pinion 29 and actuate the shaft of the pump. The hub of the gear wheel 30 is provided with a set screw 32 for securing the gear to the sleeve 31. Any other form of gearing, however, may be employed for transmitting motion to the rotary pump. When the wheel rotates, the pump operates and the air contained within the pneumatic tire is caused to circulate through the radiator coil, which, through its exterior arrangement, is cooled by the outside air. The radiator may, of course, be located within the cylindrical casing, but it is preferable to expose it to the atmosphere, as illustrated in the accompanying drawings.

In Fig. 6 of the drawings, the cooling device is connected with a circumferentially arranged cooling tube 33, located within a fold 34 of an inner tube 35 in the manner shown and described in the aforesaid application, in which the invention is generically claimed. The inner tube 35 is provided at the rim of the wheel with the circumferential fold or tubular portion 34, and the cooling tube 33 is seated on the rim of the wheel between the side portions of the outer tube or shoe, and it does not interfere with the removal of the pneumatic tire from the rim. The branch or connecting tubes 36 and 37 pierce the felly and the rim of the wheel, and also the circumferential cooling tube and are connected with the interior of the latter, and when the pump is operated, the cooling liquid is caused to circulate through the branch tubes, the radiator and the circumferential cooling tube. The liquid is introduced into and removed from the cooling tube by means of a short tube 38, piercing the felly and the rim of the wheel and communicating at its inner end with the cooling tube and equipped at its outer end with a suitable closure 39. The cooling tube may be constructed of metal, rubber or of any other suitable material, and the liquid may consist of salt water, or any other liquid cooling medium, salt water being preferred in the warmer seasons of the year, especially as it is a preservative of rubber, but alcohol or some other liquid, which will not freeze in winter under ordinary conditions, may be used during the cold months of the year.

No claim is made in the present application to the following subject-matter, which is claimed in a copending application filed by me Sept. 7, 1911, Serial No. 648,233:

The combination with a wheel having a pneumatic tire, of a circumferential cooling tube located within the tire, a radiator coil mounted on the wheel and connected with the cooling tube, a rotary pump mounted on the wheel and communicating with the radiator coil for producing a circulation of a cooling medium through the radiator coil and the tire, and means for rotating the said pump.

The combination with a wheel having a pneumatic tire provided with means for receiving a cooling medium, of a radiator coil arranged on and fitting the hub at one side of the wheel and carried by the latter and communicating with the tire, a pump mounted on and carried by the wheel and communicating with the radiator coil for producing a circulation of a cooling medium through the same and through the tire, and gearing located at the side of the wheel opposite that at which the radiator coil is arranged and including a fixed gear connected with the axle of the wheel, and a rotary gear connected with the pump and meshing with and revoluble around the fixed gear.

The combination with a wheel having a rim, of a circumferential cooling tube mounted on the rim at the sides thereof, a tire including an inner tube having a circumferential fold fitted around the sides and the outer portion of the cooling tube and terminating at opposite sides thereof adjacent to the rim, and an outer tube or shoe covering the inner tube and detachably connected with the rim, the inner and outer tubes of the tire being detachable from the rim without removing the cooling tube therefrom, and means arranged exteriorly of the tire for causing a circulation of a cooling medium through the cooling tube.

What is claimed is:—

1. The combination with a wheel having a pneumatic tire, of a casing arranged at the center of the wheel and constituting a hollow false hub section or member, a radiator coil mounted on the exterior of the casing and supported by the same, a rotary pump housed within the casing and connected with the radiator coil, branch tubes connecting the pump and the radiator coil with the pneumatic tire for causing a circulation of a cooling medium through the tire and the coil, and means for operating the pump.

2. The combination with a wheel having a pneumatic tire, of a hollow cylindrical casing mounted on the wheel centrally thereof and forming a false hub section or member, a cylindrical coil arranged on the exterior of the casing and supported by the same, an eccentrically arranged rotary pump housed within the casing and connected with one end of the coil, branch tubes connecting the pump and the coil with the pneumatic tire for circulating a cooling medium within the same, and gearing connected with the pump for operating the same.

3. The combination with a wheel having a pneumatic tire, of a hollow casing mounted on the front of the wheel at the center thereof and forming a false hub and provided at the front with a removable plate adapted to afford access to the interior of the casing and the end of the axle, a radiator coil carried by the casing, an eccentrically arranged rotary pump secured to the wheel at the front or outer side and located within the casing and having a shaft extending through the wheel to the inner side thereof, gearing connected with the inner end of the shaft for operating the pump, and branch tubes connected with the radiator coil and the pump and extending to the pneumatic tire at spaced points.

4. The combination with an axle, and a wheel having a pneumatic tire and mounted on the axle, the latter projecting from the outer side of the wheel, of a hollow casing arranged at the center of the wheel and receiving the projecting portion of the axle and provided at the inner portion with an attaching flange secured to the said wheel, a radiator coil carried by the casing, an eccentrically arranged rotary pump housed within the casing and provided with attaching lugs or flanges secured to the wheel between the axle and the peripheral portion of the casing, pipe connections between the pump, the radiator coil and the tire, and means for operating the pump.

In testimony, that I claim the foregoing as my own, I have hereto affixed my signature in the presence of two witnesses.

ANDREW B. CRAIG.

Witnesses:
 ROBERT D. CRAIG,
 GLEN F. GRAY.